United States Patent [19]
Kwon

[11] Patent Number: 5,321,674
[45] Date of Patent: Jun. 14, 1994

[54] PROGRAM SAMPLE INTRODUCTION METHOD

[75] Inventor: Tae-jeon Kwon, Seoul, Rep. of Korea

[73] Assignee: Samsung Electronics Co., Ltd., Kyungki-do, Rep. of Korea

[21] Appl. No.: 19,686

[22] Filed: Feb. 19, 1993

[30] Foreign Application Priority Data

Feb. 19, 1992 [KR] Rep. of Korea .................... 92-2436

[51] Int. Cl.$^5$ ........................................... G11B 17/22
[52] U.S. Cl. ......................................... 369/30; 369/32
[58] Field of Search ................... 369/30, 32, 33, 47, 369/34, 41, 44.28; 360/72.1, 72.2, 51

[56] References Cited

FOREIGN PATENT DOCUMENTS 0426162  5/1991  European Pat. Off. .

Primary Examiner—Robert J. Pascal
Assistant Examiner—Ali Neyzari
Attorney, Agent, or Firm—Sughrue, Mion, Zinn, Macpeak & Seas

[57] ABSTRACT

A program sample introduction method includes a first step for reproducing the program sample, when a control instruction for the program sample introducing function control instruction is input in a playback mode, concurrently setting, as the program sample introduction beginning point, the point where the control instruction for the program sample introduction function is input; a second step for ending the reproduction of the current program after a predetermined time period has elapsed from the start of the program sample introduction function begun in the 1st step; and a third step for checking whether the program introduced in the 2nd step is the final program recorded on the recording medium, and if the introduced program is the final program, ending the reproduction of the program, and otherwise searching and reproducing the program introduction point of a succeeding program, so as to repeatedly perform the 2nd step.

4 Claims, 2 Drawing Sheets

PROGRAM SAMPLE INTRODUCTION METHOD

BACKGROUND OF THE INVENTION

The present invention relates to a program sample introduction method for a digital audio signal processor, and more particularly, to a program sample introduction method for sampling various prerecorded programs by reproducing the significant parts of each program for a predetermined time.

Generally, digital audio signal processors are used to digitally process an audio signal and includes such devices as a digital audio tape recorder (DAT), laser disk player (LDP), compact disk player (CDP), digital compact cassette player (DCCP) and mini-disk player (MDP). Since these digital audio signal processors can record time information in addition to the audio signal on the recording medium, the beginning time or playing time of a program is picked up along with the audio signal. Here, the audio signal is reproduced-signal-processed and reproduced to be output, while the time information is displayed for user-recognition through such means as a digitron.

A program sample introduction function is to reproduce a small part of the contents of a program recorded on a recording medium so as to allow the user to quickly recognize a particular program. In a conventional method, program sample introduction is performed by reproducing a given program starting from its beginning point of playback and continuing for a predetermined time using the above-mentioned time information. Here, the predetermined time is about 10-15 seconds, which, in terms of duration, is sufficient for recognition. However, in most cases, the beginning of a program is purely introductory and often includes several seconds of little or no information, and is thus unfit as a sample for program recognition.

SUMMARY OF THE INVENTION

Therefore, it is an object of the present invention to provide a program sample introduction method for sampling programs by freely applying a user-specified beginning point of reproduction.

To accomplish the object of the present invention, there is provided a program sample introduction method for a digital audio signal processor in which contiguous time information corresponds to program reproduction from the playback beginning point to its ending point for every program recorded on a recording medium, the method comprising:

a 1st step for reproducing the program sample, when a control instruction for the program sample introduction function is input in a playback mode, concurrently setting, as the program sample beginning point, the point where the control instruction for the program sample introduction function is input;

a 2nd step for ending the reproduction of the current program after a predetermined time period has elapsed from the start of the program sample introduction function begun in the 1st step; and a 3rd step for checking whether the program sampled in the 2nd step is the final program recorded on the recording medium, and if the sampled program is the final program, ending the reproduction of the program, and otherwise searching and reproducing the program sample introducing point of a succeeding program, so as to repeatedly perform the 2nd step.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 1:
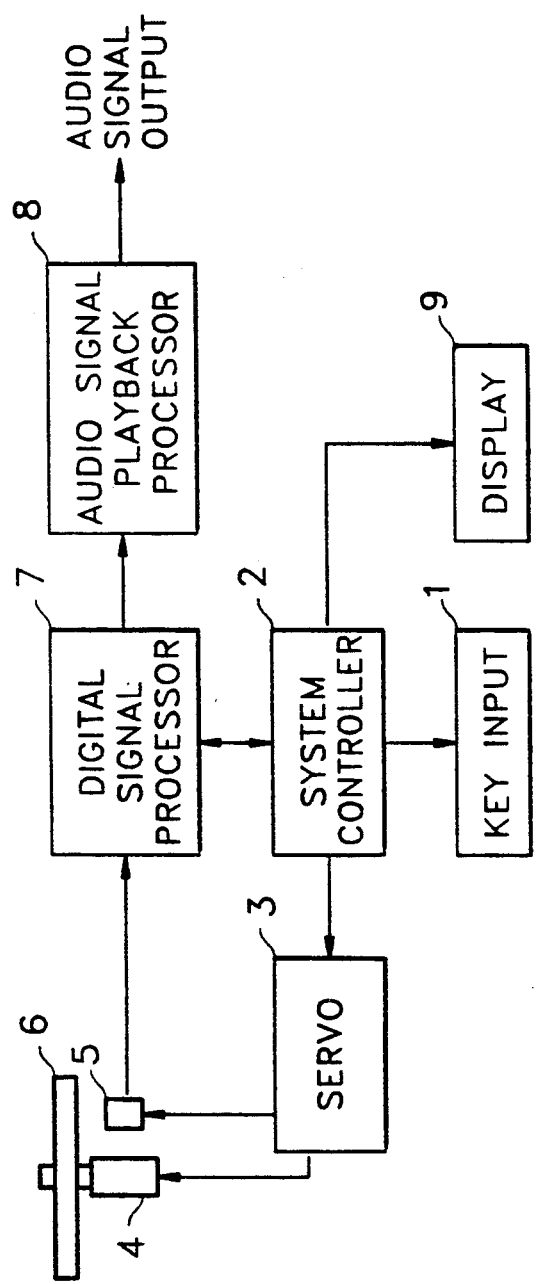
FIG. 1 is a block diagram of an apparatus for a program sample introduction method according to the present invention.

FIG. 1 illustrates a block diagram of an apparatus for the program sample introduction method according to the present invention, for instance, for use in a compact disk player.

In FIG. 1, a key input 1 is to apply user control instructions and information and has a function key for applying a program-sample-introduction control instruction in this embodiment. An optical pickup 5 records or reproduces information from an optical disk 6. A spindle motor 4 rotates the optical disk 6. A servo portion 3 receives a control signal according to the user instructions applied from key input 1 via a system controller 2 so as to control the rotation of spindle motor 4 and the operation of optical pickup 5. A digital signal processor 7 digitally processes the information picked up by optical pickup 5. A display 9 is made in a digitron form so as to display specific information output from system controller 2. The specific information includes the current playback time and the number of a program. In the embodiment of the present invention, an audio signal and time information are separated. Here, the audio signal is transmitted to an audio signal playback processor 8 and the time information is output to system controller 2, so that the apparatus can recognize a current time.

Audio signal playback processor 8 reproduces the digitally processed audio signal and outputs the reproduced signal to a speaker (not shown). System controller 2 controls the overall functions of the system according to the control signal applied from key input 1 and performs the program sample introduction function according to the flowchart shown in FIG. 2.

Figure 2:
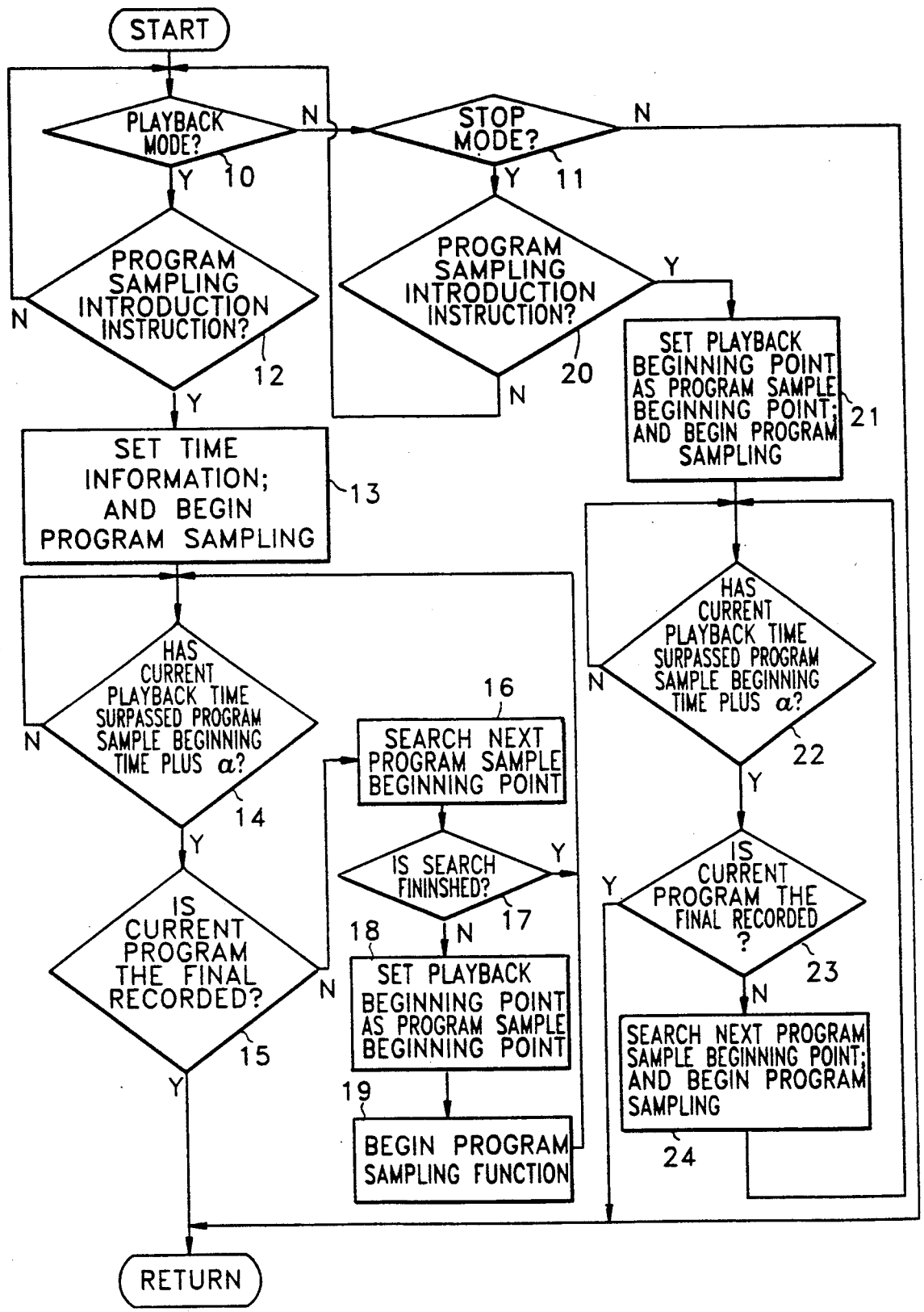
FIG. 2 is a flowchart of the program sample introduction method according to the present invention.

Referring to FIG. 2, steps 10 and 11 are to set the current operating mode of a digital audio signal processor. Steps 12-19 are to introduce program samples by a freely set user-specified period for performing the program sample introduction function. Steps 20-24 are to sample a program for a predetermined period, starting from the program's playback beginning point, as in the conventional method.

Now, the process shown in FIG. 2 will be described in detail with reference to FIG. 1.

First, given that the current operating mode of the digital audio signal processor shown in FIG. 1 is a stop mode, when a control instruction for the program sample introduction function is applied via key input 1, programs are reproduced (sampled) for a predetermined period starting from a program's playback beginning point, as in the conventional program sampling method. In contrast, if the current mode is a playback mode, when the control instruction for the program sample introduction function is applied via key input 1, the program sample introducing is carried out with the time information at the playback point where the instruction is applied set as the program sample introduction beginning time.

If the digital audio signal processor is set to the playback mode (step 10), when the control instruction for program sample introduction control instruction is applied via key input 1 (step 12), system controller 2 sets the time information applied from digital signal processor 7 as the program sample introduction beginning point so that the apparatus is operated in the program sample introduction mode (step 13). When an audio signal is input to audio signal playback processor 8, the signal is controlled so as to be output only for the program sampling period set by system controller 2. In other words, when the program sample beginning point is set, system controller 2 checks the lapse of the time information continuously applied from digital signal processor 7, taking a previously set specific time as the reference. Here, the specific reference time information, which is the program sample introduction beginning time plus a value $\alpha$, is to control the time at which the program sample is introduced (step 14). During the time-checking by system controller 2, the audio signal is continuously reproduced.

According to the checked result, if the current playback time surpasses the set specific time (program sample introduction beginning time plus $\alpha$), the playback of the introduced program sample is temporarily stopped while it is decided whether the program currently being reproduced is the final program on the recording medium (step 15). If the program is the final one, program sample introduction stops.

On the other hand, if the program is not the last program recorded, the program sample introduction beginning point of a succeeding program is searched. Here, according to the conditions set in step 13, the distance between the program's playback beginning point and program sample introduction beginning point of a currently reproduced has the same time interval between the program's playback beginning point and the set program sample beginning point. For instance, if the set time for program sampling, is 00 minutes, 30 seconds for program No. 1, then 00 minutes, 30 seconds is also the program sample introduction beginning point for program No. 2; and likewise for program No. 3.

In this manner, when the program sample introduction beginning point of the succeeding program is detected (steps 16, 17) as described above, steps 14 and 15 are repeatedly performed so as to carry out the playback of the program sample introduction for a predetermined time. However, if the program sample introduction beginning point is not detected, in other words, if the point of program sample introduction is beyond the playback ending point of the program whose sample introduction beginning point is currently being searched, the search automatically selects the playback beginning point as the program sample introduction beginning point (step 18), and performs a program sample introduction function for the predetermined time. For instance, if the program beginning point set in step 13 is not 00 minutes, 30 seconds but 02 minute 30 seconds and the overall length of the program to search is 02 minutes, 00 seconds, the playback operation for the program sampling is carried out as described before (steps 19, 14 and 15).

Meanwhile, when the digital audio signal processor is in the stop mode (step 11) and the control instruction for the program sample introduction function is applied via key input 1, as in the conventional method, a program's playback beginning point is set as the program sample introduction beginning point, to carry out the playback of the program sample for a predetermined time as in steps 13-17 (steps 22-24).

As described above, in a digital audio signal processor, the method of the present invention reproduces any portion to be regarded as significant part, for a predetermined time, taking the beginning thereof as a program sample introduction beginning point by a user. Thus, the contents of a program can be more readily identified than with the conventional method.

What is claimed is:

1. A program sample introduction method for a digital audio signal processor in which contiguous time information corresponds to program reproduction from the playback beginning point to its ending point for every program recorded on a recording medium, said method comprising:

a first step for reproducing the program sample, when a control instruction for the program sample introduction function is input in a playback mode, concurrently setting, as the program sample introduction beginning point, the point where the control instruction for the program sample introducing function is input;

a second step for ending the reproduction of the current program after a predetermined time period has elapsed from the start of the program sample introduction function begun in the 1st step; and a third step for checking whether the program introduced in the 2nd step is the final program recorded on the recording medium, and if the introduced program is the final program, ending the reproduction of the program, and otherwise searching and reproducing the program introducing point of a succeeding program, so as to repeatedly perform the 2nd step.

2. A program sample introduction method as claimed in claim 1, wherein the time differences between the program sample introduction beginning time and the playback beginning time are the same in all programs recorded on recording medium.

3. A program sample introduction method as claimed in claim 2, wherein, if, during the search of the program sample introduction beginning time of a succeeding program, the time to search surpasses the program's playback time, said third step further comprises a step for sampling a program by re-searching the playback beginning point of the program to be searched.

4. A program sample introduction method as claimed in claim 1 further comprising a fourth step for, when said digital audio signal processor is in a stop mode and said control instruction for the program sample introduction function is applied, setting, as the program sample introduction beginning point, the playback beginning point of respective programs recorded on the recording medium so as to reproduce a program for a predetermined time.

* * * * *